(12) United States Patent
Florkey et al.

(10) Patent No.: US 7,542,768 B2
(45) Date of Patent: Jun. 2, 2009

(54) DYNAMIC RING START DELAY BASED ON MULTIPLE FACTORS

(75) Inventors: Cynthia Florkey, Chicago, IL (US); Ruth Schaefer Gayde, Naperville, IL (US); John Richard Rosenberg, Elmhurst, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 330 days.

(21) Appl. No.: 11/277,248

(22) Filed: Mar. 23, 2006

(65) Prior Publication Data

US 2007/0224997 A1 Sep. 27, 2007

(51) Int. Cl.
*H04Q 7/20* (2006.01)
*H04M 3/42* (2006.01)

(52) U.S. Cl. .................. 455/445; 455/401; 455/403; 455/417; 455/428; 379/211.01; 379/211.02; 379/207.1; 379/266.03

(58) Field of Classification Search .................. 455/445, 455/517, 518, 519, 415, 567, 428, 403, 401, 455/417; 379/211.01, 211.02, 211.03, 211.04, 379/106.06
See application file for complete search history.

(56) References Cited

U.S. PATENT DOCUMENTS

| | | | |
|---|---|---|---|
| 4,700,374 A | 10/1987 | Bini | |
| 5,206,901 A | 4/1993 | Harlow et al. | |
| 5,287,401 A | 2/1994 | Lin | |
| 5,504,810 A * | 4/1996 | McNair ...................... 379/189 |
| 5,586,169 A * | 12/1996 | Pinard et al. .................. 379/82 |
| 5,636,269 A | 6/1997 | Eisdorfer | |
| 5,715,311 A | 2/1998 | Sudo et al. | |
| 5,802,160 A | 9/1998 | Kugell et al. | |
| 6,005,930 A | 12/1999 | Baiyor et al. | |
| 6,009,159 A | 12/1999 | Baiyor et al. | |
| 6,115,461 A | 9/2000 | Baiyor et al. | |
| 6,205,125 B1 * | 3/2001 | Proctor et al. ............... 370/328 |
| 7,050,563 B2 * | 5/2006 | Dammrose .................. 379/229 |
| 2004/0180654 A1* | 9/2004 | Chen .......................... 455/433 |
| 2007/0201621 A1* | 8/2007 | Ethier et al. ............. 379/32.05 |

\* cited by examiner

*Primary Examiner*—Huy Q Phan (57) ABSTRACT

Systems and methods are described for multiple leg call processing, in which the timing of a plurality of outgoing call legs is determined according to a plurality of parameters in order to achieve near simultaneous notification of a group of member directory numbers. The parameters can include static information obtained from a network database such as end user device technology type, call forwarding disposition, answering machine or voicemail service, geographic distance to the member directory number, and/or signaling type and carrier or other local information. Actual setup times may be measured for use in determining the timing of the outgoing call leg processing, which may be used alone or in combination with the local and static information parameters to determine the outgoing call schedule for routing the call to multiple member directory numbers.

11 Claims, 6 Drawing Sheets

| | | NETWORK DELAY DATABASE 86a | | | |
|---|---|---|---|---|---|
| PILOT DN | GROUP MEMBER DN | END USER DEVICE TECHNOLOGY TYPE | CALL FORWARDING DISPOSITION | ANSWERING MACHINE OR VOICEMAIL | GEOGRAPHIC DISTANCE |
| $DN_1$ | $DN_{1,1}$ | WIRELESS | NO | YES - immediate | $D_{1,1}$ |
| $DN_1$ | $DN_{1,1}$ | WIRELESS | NO | YES – after 5 rings | $D_{1,2}$ |
| $DN_1$ | $DN_{1,2}$ | PSTN | YES – FWD after 3 rings | NO | $D_{1,3}$ |
| ... | ... | ... | ... | ... | ... |
| $DN_1$ | $DN_{1,n}$ | IP | YES – immediate FWD | NO | $D_{1,4}$ |
| $DN_2$ | $DN_2$ | WIRELESS | NO | NO | $D_{2,1}$ |
| ... | ... | ... | ... | ... | ... |
| $DN_2$ | $DN_{2,m-1}$ | WIRELESS | NO | YES - immediate | $D_{2,m-1}$ |
| $DN_2$ | $DN_{2,m}$ | PSTN | NO | NO | $D_{2,m}$ |

| PILOT DN | GROUP MEMBER DN | SIGNALING TYPE | CARRIER | MEASURED SETUP DELAY TIME (ms) |
|---|---|---|---|---|
| $DN_1$ | $DN_1$ | ST1 | ABC | xxx |
| $DN_1$ | $DN_{1,1}$ | ST1 | XYZ | xxx |
| $DN_1$ | $DN_{1,2}$ | ST5 | DEF | xxx |
| ... | ... | ... | ... | ... |
| $DN_1$ | $DN_{1,n}$ | ST2 | IJK | xxx |
| $DN_2$ | $DN_2$ | ST1 | IJK | xxx |
| $DN_2$ | $DN_{2,m-1}$ | ST1 | TUW | xxx |
| $DN_2$ | $DN_{2,m}$ | ST5 | DEF | xxx |

DYNAMIC RING START DELAY BASED ON MULTIPLE FACTORS

FIELD OF THE INVENTION

This invention relates generally to the field of telecommunication systems and, more particularly, to systems and methods for processing multiple leg calls by dynamically delaying individual ring start times based on a plurality of factors.

INCORPORATION BY REFERENCE

The following U.S. Patents are hereby incorporated by reference in their entireties as if fully set forth herein: Bini U.S. Pat. No. 4,700,374; Harlow U.S. Pat. No. 5,206,901; Lin U.S. Pat. No. 5,287,401; Eisdorfer U.S. Pat. No. 5,636,269; Sudo U.S. Pat. No. 5,715,311; Kugell U.S. Pat. No. 5,802,160; Baiyor U.S. Pat. No. 6,005,930; Baiyor U.S. Pat. No. 6,009,159; and Baiyor U.S. Pat. No. 6,115,461.

BACKGROUND OF THE INVENTION

Telecommunications has become a major part of everyday life in modern society, allowing people to directly communicate with one another regardless of current location and to leave voicemails when a called party is busy on another call or is otherwise unavailable to answer. An important service to many customers is the ability to have an incoming call cause two or more phones to ring, with the call being connected to the first phone to answer. One example includes device extensions within homes or offices, where each land-line phone will ring to indicate an incoming call. When an answering party picks up one of the phones, the call is delivered to the answered phone, and all the phones stop ringing. In this service, moreover, additional parties may join the call after the initial call delivery by simply picking up their extension. Wireless systems provide so-called flexible alerting (FLEX ALERT) services that are intended to provide somewhat similar functionality, wherein each member of a predefined group (e.g., flexible alerting group) of directory numbers (DNs) is alerted when a call comes in to an associated primary directory number. In conventional flexible alerting implementations, a mobile switching center (MSC) receives the incoming call to a pilot or primary DN and fans the call out to a plurality of call legs (e.g., directs the incoming call to the multiple different mobile or wireline secondary DNs of the predefined alerting group), and whichever outgoing call leg is the first to answer will receive the call, with the remaining legs being released. IP-based telephony systems also provide generally equivalent multiple call leg functionality, sometimes referred to as Simultaneous Ringing (SIM RING) services. Moreover, such multiple call leg services are available across groups including multiple technology type devices, wherein an alerting group may be comprised of land-line phones, wireless phones, and/or IP-based phones.

As can be appreciated, it may be desirable in all the above variants of the multiple call leg type services to provision the multiple call legs such that the end point devices ideally ring or otherwise alert the user at approximately the same time. For instance, the predefined group of secondary DNs may correspond to members of a sales force, where each group member is ideally given an equal chance of receiving the incoming call. However, if the call processing time for some member devices is different than others and the individual call legs are sent out at the same time, a first member phone may in some cases ring several times before another device rings once. As a result, the call may be answered by one member before another member (associated with long processing delays) even hears a ring, and thus certain member devices associated with the longest delays relative to the primary DN may never be given the opportunity to answer the incoming call. To address these circumstances, certain approaches provide for sending out the different call legs at different times in order to attempt to compensate for different delays in the different legs, wherein a home location register provides delay parameters for each member DN in a given group, and these are used to determine when each leg will be initiated by the MSC. In the conventional implementations, however, the rings are generally delayed by static amounts, and the service does not account for dynamic changes that could cause the rings to be skewed in time. Further complicating the situation is the possibility that one or more member DNs may be connected to (or subscribed to) ancillary answering or forwarding mechanisms or services. For instance, answering machines or voicemail services may be associated with a particular member phone, which can be configured to pickup immediately or after a predetermined number of rings. Also, call forwarding services may be enabled for a given member, which forward an incoming call to the member DN to another location, and the forwarding may be programmed to occur immediately, or after a certain number of rings, etc. In view of these and other conditions and possible configuration variations in the group member devices, the conventional approaches to multiple call leg situations cannot ensure that the members are alerted at the same time, particularly as conditions change, whereby there is a continuing need for improved methods and systems for processing multiple leg calls.

SUMMARY OF THE INVENTION

The following is a summary of one or more aspects of the invention to facilitate a basic understanding thereof, wherein this summary is not an extensive overview of the invention, and is intended neither to identify certain elements of the invention, nor to delineate the scope of the invention. Rather, the primary purpose of the summary is to present some concepts of the invention in a simplified form prior to the more detailed description that is presented hereinafter. The various aspects of the present invention relate to multiple leg call processing that may be employed as an improvement in flexible alerting and simultaneous ring services, allowing adaptation of the call leg processing according to a number of factors such as static parameters stored in a network database, local information known by the call routing apparatus and/or measured setup time information, by which the call leg processing can be ordered and implemented to achieve near simultaneous or otherwise predictable and repeatable ringing, even when call routing and processing conditions are changing.

In accordance with one or more aspects of the present invention, multiple call leg processing methods are provided for processing a call to a primary directory number (DN) associated with a plurality of secondary DNs, in which a delay value is determined for each of the member DNs, with each delay value being determined according to a plurality of parameters. A call leg schedule is determined for processing a plurality of outgoing call legs to the member DNs based on the delay values, and the method further provides for processing and routing of the plurality of outgoing call legs according to the call leg schedule. Thus, whereas prior flexible alerting systems employed a single generally static delay parameter, the present invention uses a plurality of factors, such as end user equipment configuration, routing delays, etc. in determining the timing of the actual alerts provided to the equipment at the member directory numbers, so as to facilitate the near simultaneous ringing desired in many multiple call leg services. In particular embodiments, the delay values for the directory numbers are determined according to a plurality of parameters obtained from different network entities. For example, certain static information may be obtained from a network data store including end-user device technology type, call forwarding disposition, answering machine or voicemail service, and geographic distance to the member directory number. Local parameters may be obtained from a routing control function, such as signaling type and carrier information, and actual call setup times may be measured for use in determining the plurality of delay values. In accordance with further aspects of the invention, the methods may provide different forms of call leg processing and routing based on the determined delay values. In one implementation, the call legs are processed serially, with the first call leg associated with the smallest delay value being sent first, followed by the leg associated with the next smallest delay value, and so on. In another possible implementation, the call leg processing and routing involves determining start times for each call leg according to the delay values of a call leg schedule, and sending call setup messages for each of the outgoing call legs, the setup messages including the corresponding start time, with the far end equipment controlling the time at which the user devices are actually alerted to the incoming call.

In accordance with other aspects of the invention, a system is provided for processing multiple leg calls to a primary directory number associated with a plurality of secondary directory numbers, comprising a call control element coupled with a communications network to receive an incoming call to a primary directory number associated with a plurality of secondary directory numbers. The system also provides a routing control element operatively coupled with the call control element and with the network to route the outgoing call legs to the corresponding member directory numbers, where the routing control element stores local information parameters such as signaling type and carrier, etc., for each of the member directory numbers. The call control element obtains the local information parameters from the routing control element, determines a plurality of delay values corresponding to the plurality of member directory numbers, with each delay value being determined according to a plurality of parameters associated with the corresponding member directory number, and processes a plurality of outgoing call legs to the plurality of member directory numbers according to the plurality of delay values. In one implementation, the system also includes a network database or other data store operatively coupled with the network, which stores static information parameters associated with each of the member directory numbers including at least one of end user device technology type, call forwarding disposition, answering machine or voicemail service, and geographic distance to the member directory number. The call control element obtains the static information parameters from the network data store and determines the plurality of delay values at least in part according to the static information parameters. In certain embodiments, moreover, the call control element may measure call setup times for the member directory numbers and determine the plurality of delay values at least in part according to the measured call setup times.

BRIEF DESCRIPTION OF THE DRAWINGS

The following description and drawings set forth in detail certain illustrative implementations of the invention, which are indicative of several exemplary ways in which the principles of the invention may be carried out. Various objects, advantages, and novel features of the invention will become apparent from the following detailed description of the invention when considered in conjunction with the drawings, in which.

DETAILED DESCRIPTION OF THE INVENTION

Figure 1:
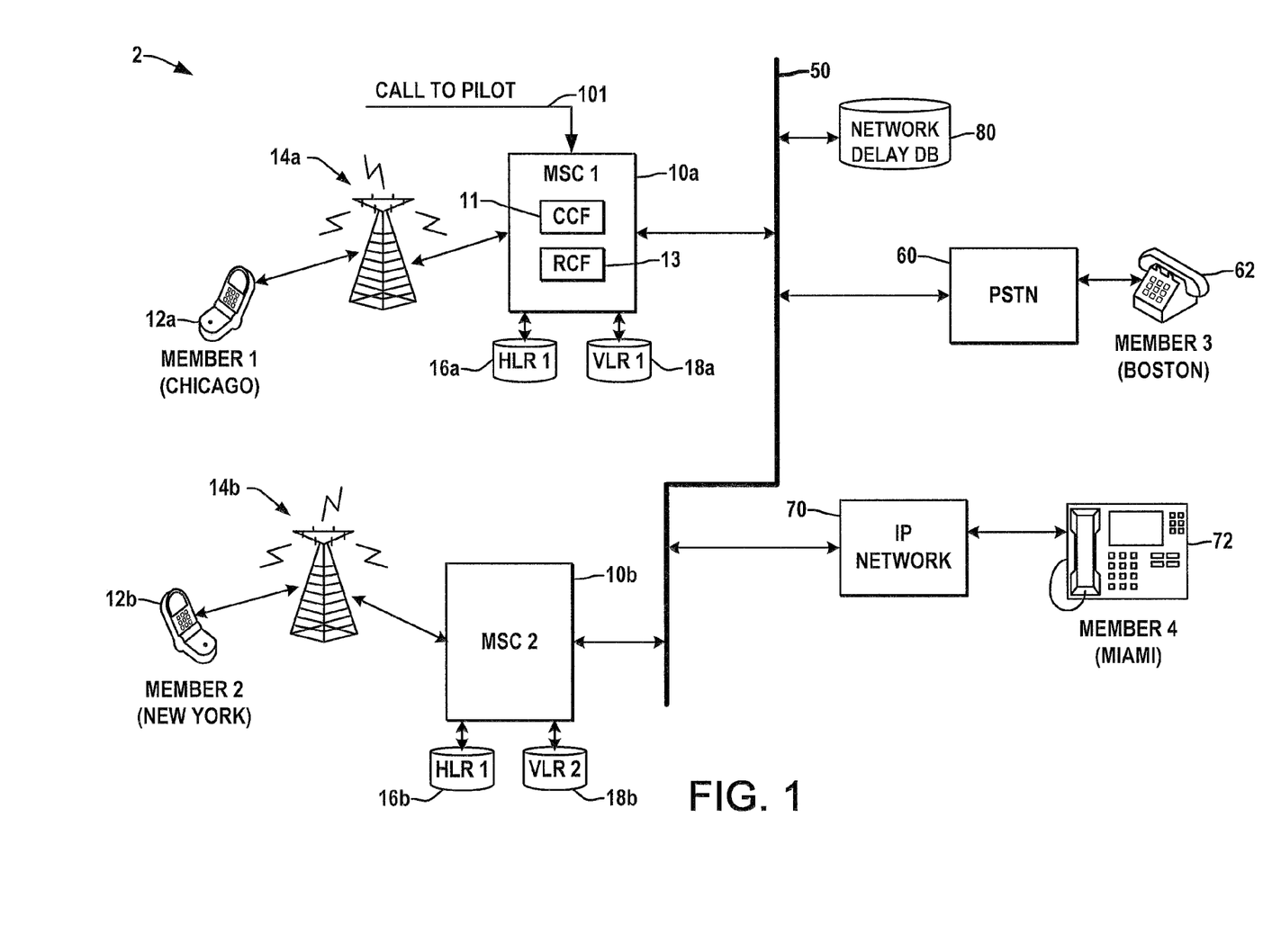
FIG. 1 is a system level illustration showing a telecommunications system including various networked communications equipment with a system for processing multiple leg calls to a primary directory number associated with a plurality of secondary directory numbers in which various aspects of the present invention may be carried out.

Referring now to the figures, several embodiments or implementations of the various aspects of the present invention are hereinafter illustrated and described in conjunction with the drawings, wherein like reference numerals are used to refer to like elements. FIG. 1 shows an exemplary telecommunications system 2 in which one or more aspects of the present invention may be implemented. The system 2 comprises a number of network communication equipment to facilitate transfer of voice and/or data between various user equipment, with several exemplary elements being shown to illustrate the various aspects of the invention. The system 2 includes mobile switching centers (MSCs) 10 operatively coupled with a network 50 and base station systems (BSSs) 14 together providing communicative connection of various wireless communications devices with each other and various network elements and other networks 60 and 70 to allow telephones, mobile units, computers, digital assistants, etc. to communicate with one another for exchange or transfer of voice, short text messages, and/or data or other information therebetween. In particular, calls may be placed between calling and called parties using various wireless and/or land-line user equipment (UE) 12, 62, 72 which are operatively coupled with call control elements and one or more networks 50, 60, 70 formed by operative interconnection of various network elements, wherein two exemplary MSCs 10a and 10b are illustrated in FIG. 1. In practice, the system 2 can in general include any type or types of communications networks and network elements, including but not limited to a Public Switched Telephone Network (PSTN) 60 for communication with one or more land-line telephones 62, mobile networks for communicating via mobile user equipment 12, an Internet Protocol (IP) network 70 for communications using VoIP phones 72, computers, or other IP-based devices, and combinations thereof, wherein the various network elements are operatively associated with one another to allow communications therebetween and therethrough with respect to data and control signaling or messaging.

The MSCs 10 perform normal switching functions and include call control functions 11 and routing control functions 13 for calls between mobile user equipment 12 and other telephone and data systems, with associated Home Location Registers (HLRs) 16 and Visitor Location Registers (VLRs) 18, where the HLRs 16 in general provide a database used for storage and management of customer subscriptions and service profiles to facilitate routing calls to and from indicated subscribers, and the VLRs 18 provide a database storage and access functionality with respect to temporary information about roaming subscribers such that the MSCs 10 can service visiting mobile units 12. In general, the switching elements 10, HLRs 16 and VLRs 18 can be any suitable hardware, software, combinations thereof, etc., which are operatively coupled with the network 50 to provide call service functionality as is known, including but not limited to routing and control functions 13 and 11, respectively, as well as the multiple leg call processing functionality illustrated and described herein. Moreover, the switching elements 10, HLRs 16, VLRs 18, and the functionality thereof may be implemented in integrated entities or may be distributed across two or more entities in the system 2, for instance, where the elements 10, 16, and 18 may themselves be integrated with one another or may be separate entities. The MSCs 10, moreover, preferably include memory and processing elements (not shown) for storing and executing software routines for processing and switching calls as well as for providing various call features to calling or called parties, and further provide for the call leg schedule determination, setup time delay measurement, and parameter evaluation functions described herein. The MSCs 10 are generally operative with any suitable circuit, cell, or packet switching and routing technologies, including but not limited to Internet Protocol (IP) and Asynchronous Transfer Mode (ATM) technologies, etc., and are operatively interconnected by bearer and control traffic links (not shown) to accommodate exchange or transfer of bearer traffic (e.g., voice, video, or image data, etc.) as well as control traffic (e.g., inter-node signaling in accordance with SS7 ISDN User Part (ISUP) or SIP protocols, etc.), respectively, wherein such links may be logical links implemented, for example, as T1 carrier, optical fiber, ATM links, wireless links, and the like.

The MSCs 10 are interoperable with various forms of mobile user equipment 12, wherein two exemplary wireless phones 12a and 12b are shown in FIG. 1 for ease of illustrating the various aspects of the invention. With respect to the system 2 as a whole, any form of user equipment 12 may interface with the system 2 via BSSs 14, MSCs 10, and networks 50, 60, 70 for placing or receiving calls, for example, wireline or Plain-Old-Telephone-Service (POTS) phones 62 communicating via the PSTN 60, mobile communication devices such as mobile phones 12 and/or personal digital assistants (PDAs), pagers, computers with wireless interfaces, or other wireless devices communicating via one or more of the BSSs 14 and MSCs 10, and IP-based devices, such as computers, VoIP phones 72, etc. interacting via the IP network 70. The operative coupling of the wireless mobile phone user equipment 12 with the MSCs 10 may be of any suitable form, for example, including the illustrated BSS equipment 14 providing radio-related functions, where the BSSs 14 preferably comprise base station controllers (BSCs) and base transceiver stations (BTSs), schematically illustrated in FIG. 1, to transfer voice and data traffic between the mobile stations 12 and the MSCs 10.

The illustrated user devices are members of a flexible alerting group, where the first MSC 10a is the home MSC for a first member (MEMBER 1) in Chicago having phone 12a, and the MSC 10a is operatively coupled with the network 50 to provide communications service to any number of wireless units including the exemplary first mobile unit 12a, and is also coupled with a first HLR 16a that stores subscription information relating to the mobile 12a, and a first VLR 18a to facilitate the MSC 10a providing communications services to wireless devices. A second member device 12b (MEMBER 2) is also a mobile phone, shown operating in an area of New York served by the second MSC 10b, where MSC 10b is also operatively coupled with the network 50 to provide communications service to user equipment 12b using base station system 14b, HLR 16b, and VLR 18b, wherein MSC 10b is currently serving user equipment 12b and may, but need not be, the home MSC for mobile 12b. A third member (MEMBER 3) is a land-line phone 62 connected to the PSTN 60 in Boston, and a fourth member (MEMBER 4) has a VoIP phone 72 in Miami that communicates via the IP network 70.

When the MSC 10a receives an incoming call 101 to a primary DN associated with a group of secondary DNs (e.g., secondary DNs corresponding to the member devices 12a, 12, 62, and 72 in one example), the system 2 provides for processing of corresponding call legs to the member DNs of the group, which members may include the secondary DNs as well as the primary DN. The call control element 11 of the MSC 10a receives the incoming call 101 and obtains parameters from one or more network elements, such as the routing control function 13, the network database 80, and/or from the far end points associated with the member DNs, and uses the parameters to determine a plurality of delay values for use in routing the individual call legs so as to present the group members with the opportunity to answer the incoming call 101. In accordance with one or more aspects of the invention, moreover, the individual delay values are determined according to a plurality of parameters.

Figure 2A:
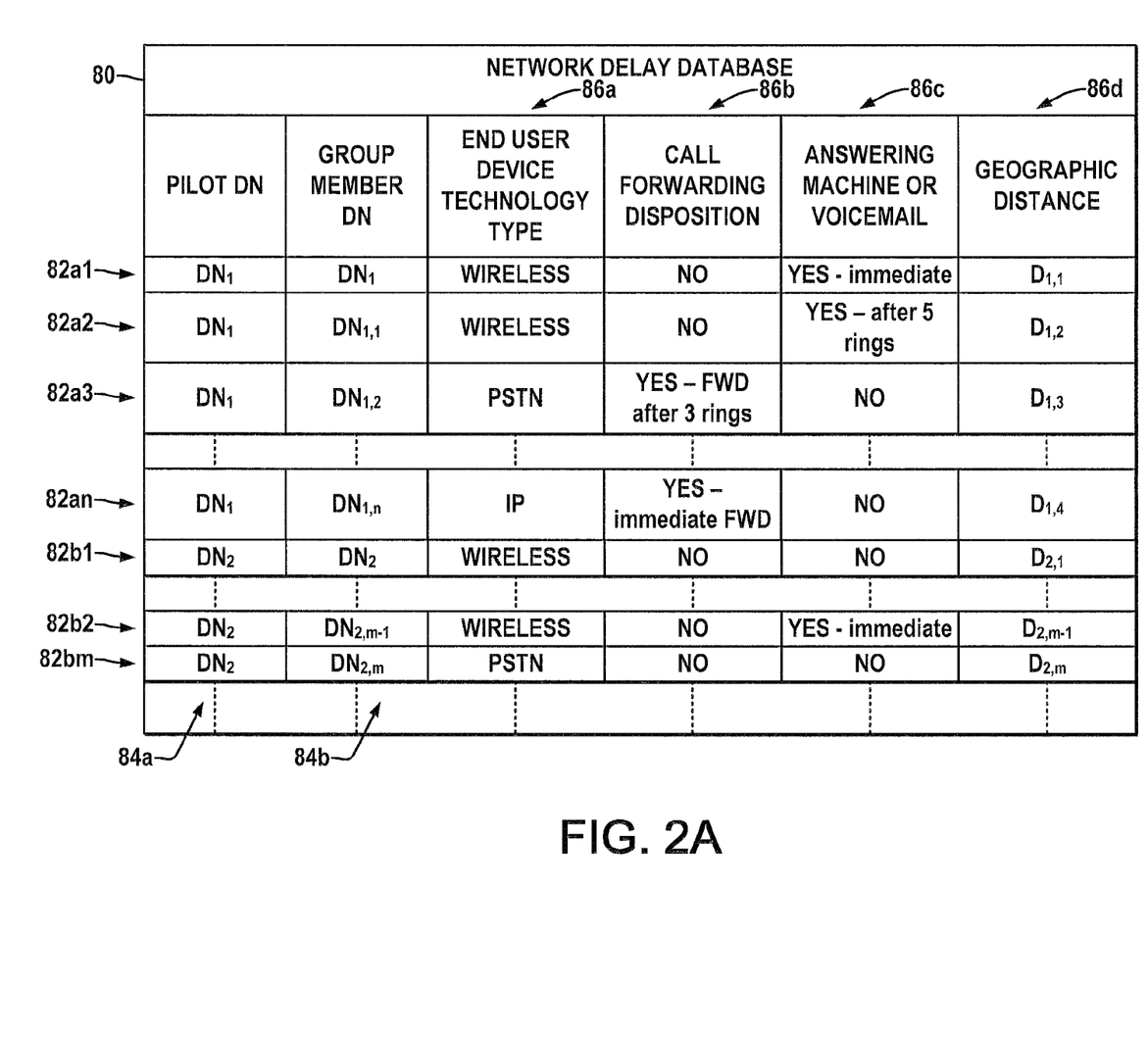
FIG. 2A is a schematic diagram illustrating an exemplary network database in the system of FIG. 1, including various static information for member directory numbers associated with a primary pilot directory number.
Figure 2B:
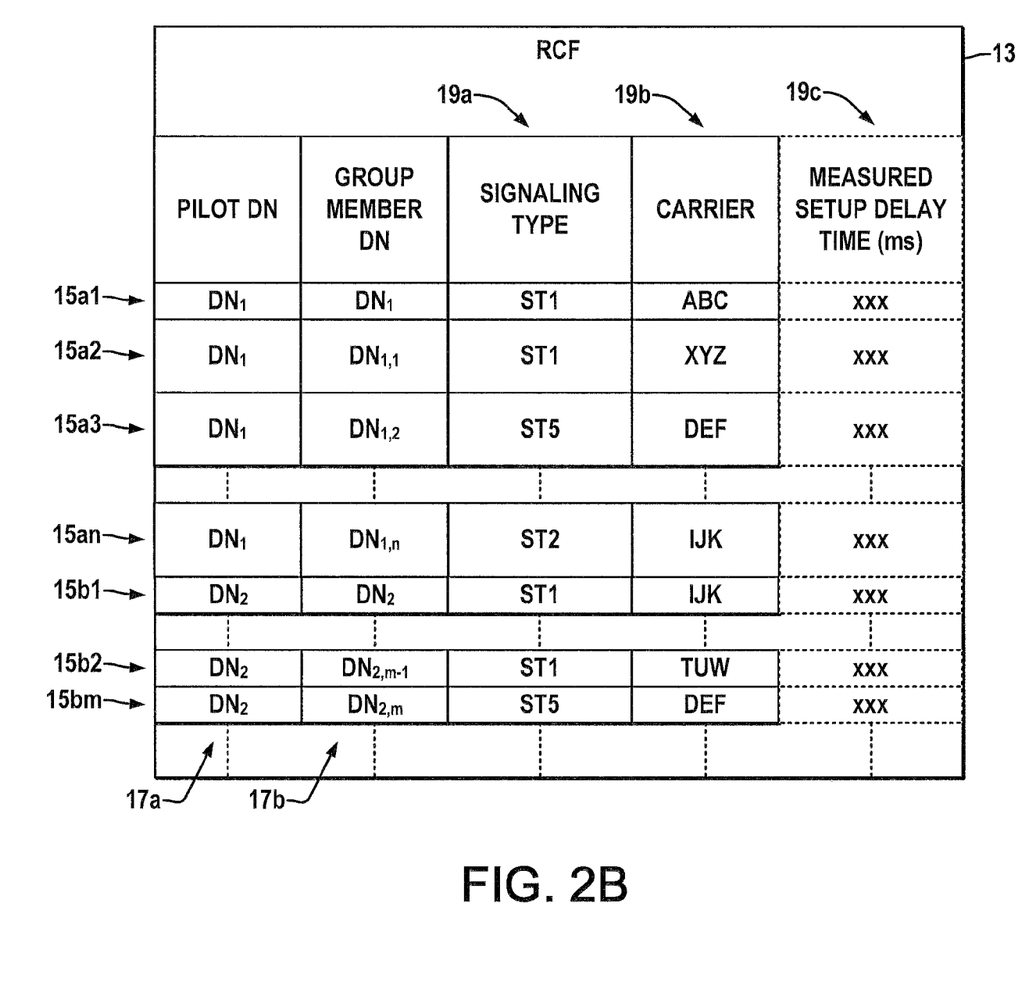
FIG. 2B is a schematic diagram illustrating various local parameters stored in a routing control function in the system of FIG. 1, including signaling type and carrier parameters for a plurality of member directory numbers associated with a primary directory number, as well as measured setup delay time values.

Referring also to FIGS. 2A and 2B, a network database 80 is also provided in the system 2, including stored information 86 related to the group member devices 12a, 12b, 63, and 72, as best shown in FIG. 2A. The database 80 includes a plurality of entries 82 for each primary DN, wherein entries 82a1-82an and 82b1-82bm are shown for two alerting groups having "n" and "m" member DNs, respectively. The database 80 can be any suitable data store accessible through suitable messaging (e.g., queries and responses) via the network 50, which operates to store the information illustrated and described herein, and which can be organized in any suitable fashion to provide information related to individual member DNs within a given group associated with a primary DN. The exemplary network delay database 80 shown in FIG. 2A includes a number of entries 82, wherein each entry 82 includes a primary DN 84a, a member DN 84b, and one or more static parameters 86 associated with the member DN, wherein the group member DN entry 84b for the first entry 82a1 may include the primary $DN_1$ as a member of the group to which a call leg may be directed. In the illustrated implementation, the static parameters 86 include end user device technology type 86a, call forwarding disposition 86b, answering machine or voicemail service 86c, and geographic distance to the member directory number 86d, although any number of such parameters 86 may be provided in a given entry 82 associated with a given member DN and one or more of the illustrated parameters 86 may be omitted in other implementations. While the database parameters 86 are referred to herein as static, the individual parameters values or information may be changed from time to time by a suitably authorized network element, for instance, when a user associated with one of the member DN devices changes locations (e.g., parameter 86d), changes device type (86a), and/or reconfigures call forwarding, answering machine, and/or voicemail services or equipment (parameters 86b, 86c), by which the parameters 86 at any given time reflect the operational capabilities and configuration of the member DN user equipment 12, 62, 72.

As shown in FIG. 2B, the routing control function (RCF) 13 of the receiving MSC 10a operates to provide routing functions for outgoing calls including the call legs of multiple leg call processing, and also stores local information parameters 19 for the group member DNs such as signaling type 19a and/or carrier information 19b, and may optionally store actual measured setup time information 19c associated with the member DNs 17b in a group associated with a given pilot DN 17a. The values 19 may be stored as entries 15 for the member DNs of members 17b associated with a given primary DN 17a as shown in FIG. 2B or may be saved in another network element or data store operatively associated with, or updatable by, the RCF 13. Furthermore, the entries 15 may include delay info for a range of DNs, such as for all numbers corresponding to 630-713-xxxx, or to an entire area code 630-xxx-xxxx, wherein the data for entry columns 19 may be stored in any suitable fashion to allow indexing for a given member DN, wherein the data store of the routing control function 13 may, but need not have the granularity down to a ten digit directory number. In the illustrated implementation, the routing control function 13 is implemented in the MSC 10a, whereas for land-line based systems, the routing functionality can be a 5ESS or a BGCF or MGCF.

The CCF element 11 in one embodiment obtains the local information parameters 19 from the RCF 13 and obtains the static information parameters 86 from the network database 80 for the member DNs, and determines a plurality of delay values corresponding to the plurality of member directory numbers according to the parameters 19, 86. Other embodiments are possible, wherein the delay values are determined based on the local parameters 19 alone or on the static parameters 86 alone. The delay values are used to create or construct a call leg schedule, for instance, specifying the ordering of the individual call legs with time values between each call leg, and the CCF 11 processes and routes the outgoing call legs to the plurality of member directory numbers according to the schedule. In other embodiments, the CCF 11 or other network element measures call setup times 19c, which may be stored in the routing control function 13 as shown in phantom in FIG. 2B, where the CCF 11 determines the plurality of delay values at least in part according to the measured call setup times 19c. In this regard, where such measured delay times 19c are obtained, the system may forego the consideration of the local parameters 19a, 19b, and determine the delay values using the measured delay times in conjunction with the static parameters 86 from the data store 80. In one example illustrated below in FIG. 5, the CCF 11 or other service logic entity sends latency determination messages to the far end points associated with the member DNs, such as an actual call setup message that instructs the endpoints to allocate the endpoint facility without application of a ring or other user alert, and the CCF 11 times the delay between sending these setup messages and receiving responses from the endpoints to determine the delay values 19c.

It is noted that there may be circumstances in which it is not desired that all the call legs arrive at the corresponding member DN equipment simultaneously, in which case the call leg schedule can be constructed to provide for controlled temporal staggering to achieve any desired relative call leg arrivals at the end point devices. For instance, the presence and configuration/disposition of voicemail and/or answering machines or services (e.g., static parameter 86c in FIG. 2A) may cause simultaneous ringing to be undesirable, such as where such a service/machine is programmed to pick up an incoming call after a certain number of rings, wherein certain answering devices or services may pick up immediately. In such a case, it may be desirable to send the call to other member devices earlier to ensure that the corresponding users have an opportunity to answer the call before the voicemail/answering machine answers the call. Further in this regard, the presence and configuration of call forwarding services (parameter 86b) may be such that the forwarded number is not alerted until a given number of rings at the original member DN, wherein it may be preferable to delay the other call legs to provide rings to the entire group including the forwarding number. For instance, if a call to a given member DN is not forwarded until after 3 rings (e.g., entry 82a3 in the network database 80 of FIG. 2A), a call schedule may be constructed by the CCF 11 to ring that DN first and ring the remaining member DNs after 3 rings. It will be appreciated, therefore, that the logic in the CCF 11 may construct the call schedule in consideration of any or all of these and other scenarios based on the scrutinizing the static database parameters 86. In addition, the local information, such as carrier 19b, signaling type 19a, etc. may also be used to set the delay values of the schedule to achieve any desired simultaneous alerting or controlled temporal offset or skewing of the outgoing call legs, providing controllability not achievable using flex alert, sim ring, or other conventional multiple call leg services. In this regard, such offsets may be factored into the delay value determination by the CCF 11.

In one example, the call schedule may be constructed by the CCF as essentially an ordered list of the call legs from the longest to the shortest delay values such that the "slowest" call legs are process first and the "fastest" legs are processed last. In this case, the schedule may comprise a list of the ordered call legs by member DN with an associated delay value, wherein the delay value for the first call leg may be zero. In this case, the call processing involves waiting for the specified delay time and then sending the current call leg, and the process is repeated until all call legs are sent, essentially in serial fashion (e.g., the CCF 11 controls the relative timing for releasing the call legs according to the schedule). In another possible embodiment, as illustrated and described further below with respect to FIG. 4, the individual call leg setup messages may each be sent out (serially or in parallel or combinations thereof) with a specified call start time, in which case the call control points scrutinize the start time value received with the call leg setup message and wait until the specified time to begin ringing the member DN equipment.

Figure 3:
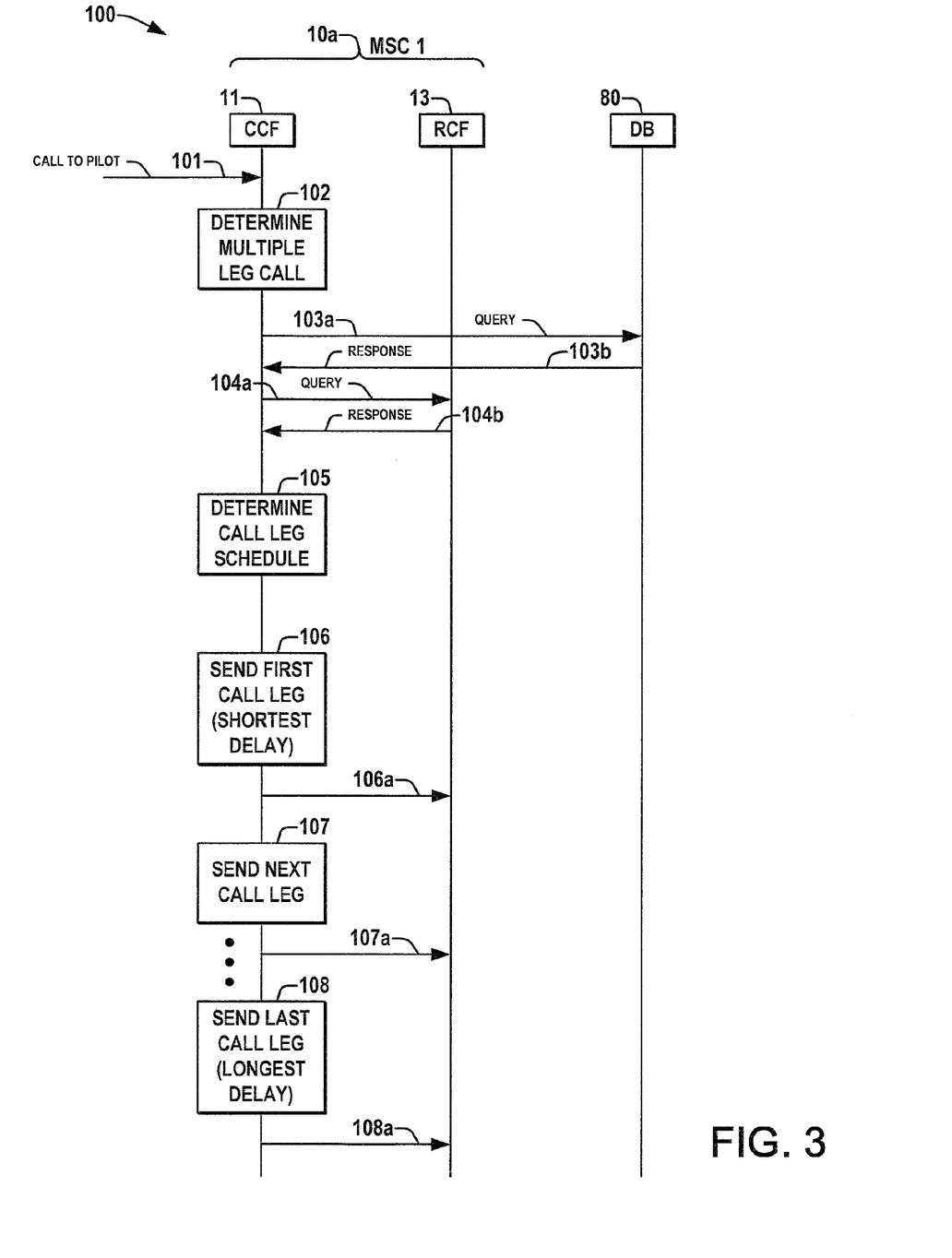
FIG. 3 is a call flow diagram illustrating operation of the system of FIGS. 1-2B in serially processing multiple leg calls according to local and static information in accordance with one or more methods of the invention.

Referring also to FIG. 3, an exemplary call flow diagram 100 illustrates operation of the system 2 in serially processing multiple outgoing leg calls according to local and static information in accordance with one or more aspects of the invention, beginning with receipt by the CCF 11 of MSC 10a of an incoming call to the pilot or primary DN at 101. The CCF 11 determines at 102 that the call is a multiple leg call to the primary DN that is associated with a plurality of secondary DNs, and sends a query message 103a to the delay database 80 requesting the static parameters 86 (FIG. 2A above) for the member DNs which are returned in a response message(s) 103b. It is noted that the CCF 11 may initially obtain the member DNs associated with the called primary DN from the HLR 16a as in current flexible alerting services, or may obtain the entries 82a1-82an from the database 80 to ascertain the member DNs 84b associated with the pilot DN 84a.

To augment this initial set of parameters 86 with locally available route information, the CCF 11 in this implementation also queries the RCF 13 at 104a and receives a response 104b including the local delay factors or parameters 19a, 19b (FIG. 2B above) gleaned from the locally available route information for each call leg. The service logic of the CCF 11 uses these multiple parameters 19, 86 to determine delay values for each of the member DNs to construct the call leg schedule at 105 for processing and routing the call legs associated with the incoming call 101. In the example of FIG. 3, the schedule is used by the CCF 11 to initiate the call legs at different times, essentially in serial fashion, with the first call leg (shortest delay) being provided to the RCF 13 for routing at 106 via message 106a, the second being sent at 107 via message 107a, and so on, until the final call leg is sent to the RCF 13 at 108 via message 108a, wherein the CCF 11 controls the timing of the messages 106a, 107a, . . . , 108a according to the call schedule. In this manner, the timing of the call legs is controlled by the CCF 11 in accordance with the delay values, which in turn, are determined according to a plurality of parameters 19, 86 for each of the individual member DNs, by which any desired simultaneous or temporally offset end user ringing pattern can be achieved using the best available information with respect to the actual time of delivery.

Figure 4:
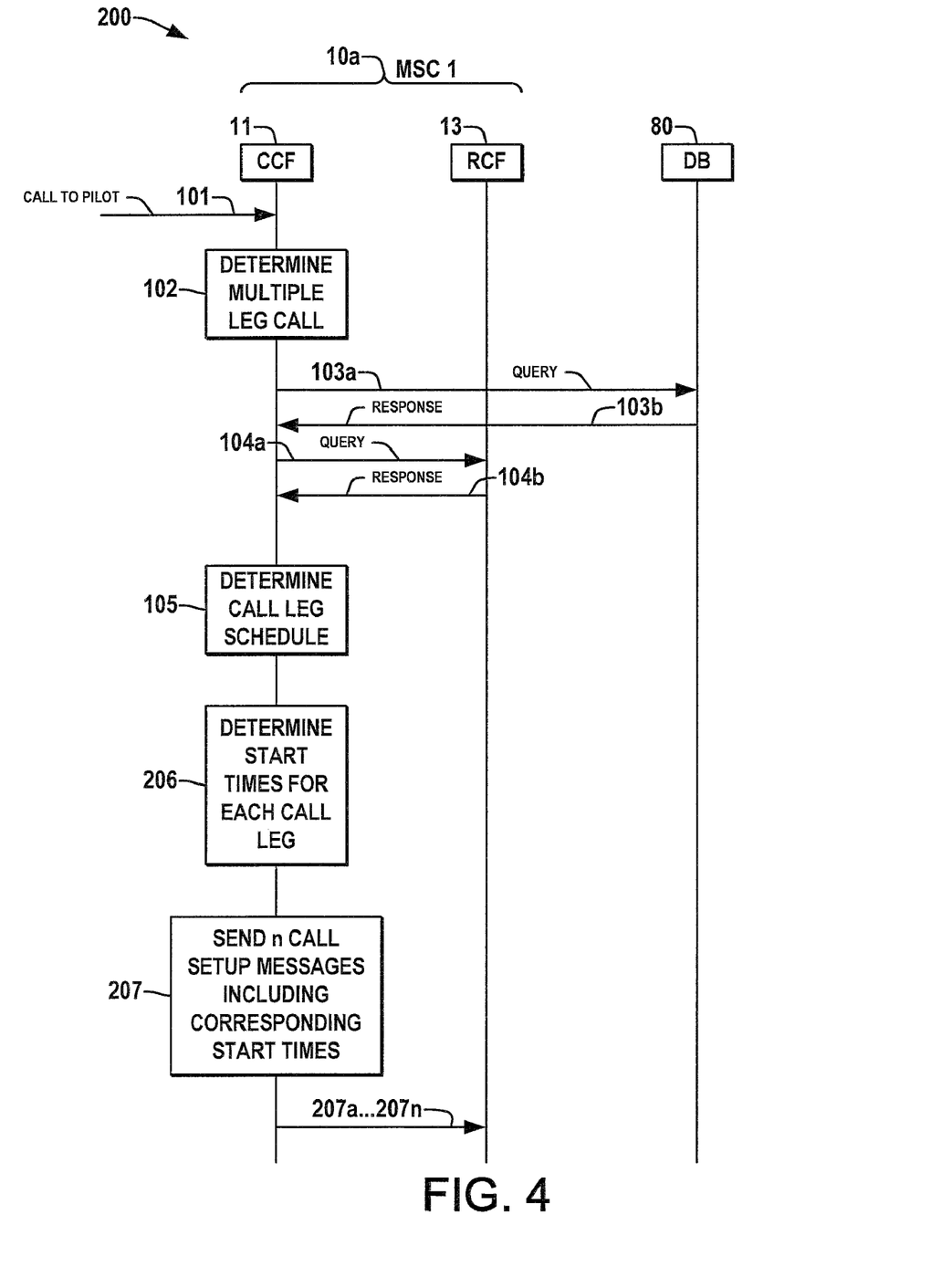
FIG. 4 is a call flow diagram illustrating alternate operation of the system of FIGS. 1-2B in processing the leg calls in which start times are determined and provided with the call legs in accordance with the invention.

FIG. 4 illustrates another exemplary call flow diagram 200, in which the ring alerting is controlled by the far endpoints, where the service logic of the CCF 11 includes a specific start time in each call setup message, thereby indicating to the endpoints when to start ringing, whether to achieve simultaneous ringing of all the member DN devices, or to implement a controlled ringing pattern with desired offsets to account for answering machines/services, call forwarding services, etc. In this embodiment, the CCF 11 receives the incoming call 101 and determines that the call is a multiple leg call to the primary DN at 102, as in the previous example. The CCF 11 again sends a query message 103a to the delay database 80 and receives the static parameters 86 via a response 103b. In addition, the CCF 11 queries the RCF 13 at 104a and receives a response 104b including the local parameters 19a, 19b to augment the delay determination with locally available route information. The CCF 11 also determines the delay values and the call leg schedule at 105 using the parameters 19, 86. In addition, the CCF 11 defines explicit start times for each call leg at 206 and sends a plurality of ("n") call setup messages 207a through 207n at 207, each including the corresponding start time for alerting the users of the member DNs. In this manner, the CCF 11 tells the local call control functions (e.g., switches) associated with the individual endpoint devices an explicit time at which to begin ringing the user devices. In another possible implementation, the telephones associated with the group DNs could themselves be provisioned with the functionality for controlling the start of user alerting (e.g., ringing), in which case the start time information could be provided to the group phones which then initiate the user alerting at the designated times.

Figure 5:
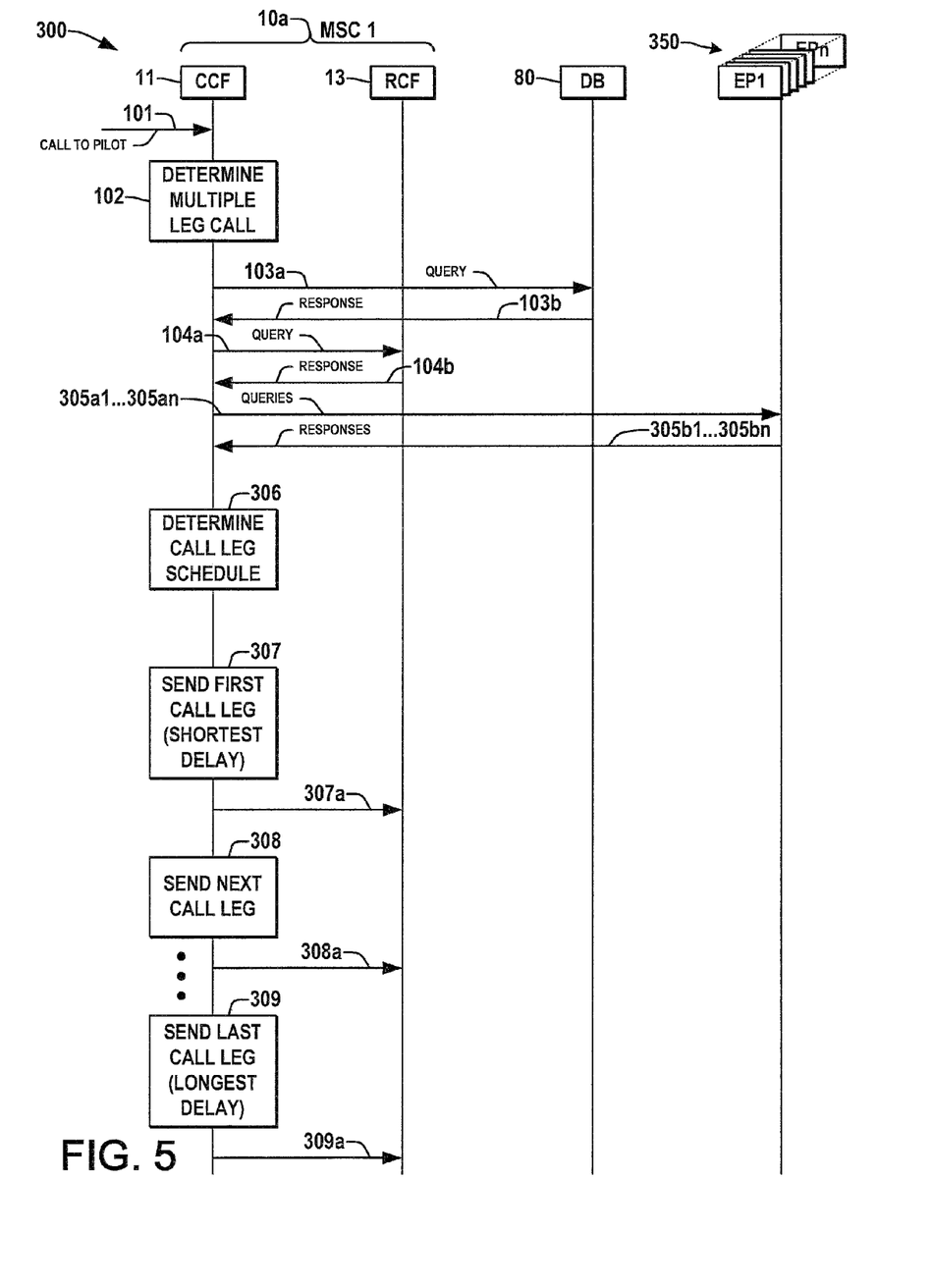
FIG. 5 is a call flow diagram illustrating another exemplary form of system operation in which actual setup delay times are measured and used in processing multiple call legs according to certain aspects of the invention.

Referring now to FIG. 5, another implementation 300 involves dynamic determination of real-time network latency, for instance, as a third or alternate source of delay factors to be used in determining the delay values by the CCF 11. It is noted that while this example shows use of parameters 86, 19a, and 19b (FIGS. 2A and 2B above), together with the measured delay values 19c in the delay value/call leg schedule determination, other implementations are possible in which the actual delay values 19c are used alone or in combination with the static parameters 86. In the illustrated example, the CCF 11 receives the incoming call to the pilot DN at 101 and determines at 102 that the call is a multiple leg call. A query message 103a is sent to the database 80 and the response 103b provides the CCF 11 with the static parameters 86. The CCF 11 also optionally queries the RCF 13 at 104a and receives the local parameters 19a, 19b in a response 104b indicating the locally available route information for each member DN. The service logic of the CCF 11 then sends an integer number "n" latency determination messages 305a1 through 305an to the call control functions (e.g., switches) at endpoints 350 (EP1-EPn) and receives corresponding responses 305b1 through 305bn. Based on the time the responses 305b are received, the CCF 11 determines an actual call setup delay time 19c for each of the member DNs, which may then be stored at the RCF 13, for example. The messages 305a, moreover, may be actual call setup messages that instruct the endpoints 350 to allocate the resources for the incoming call leg without application of an alerting signal. Thereafter, the CCF 11 constructs the call leg schedule at 306, including determination of the plurality of delay values for the member DNs, and begins serially processing the call legs at 307-309. In this example, the first call leg (shortest delay) is sent to the RCF 13 at 307 via message 307a, the second call leg is sent at 308 via message 308a, and so on, until the last call leg is sent at 309 via message 309a, wherein the timing of the messages 307a, 308a, . . . , 309a is controlled by the CCF 11 according to the call schedule. Alternatively, the call setup messages 307a, 308a, . . . , 309a could be sent in a group with these messages including explicit start times determined by the CCF 11 so that the switches or other control points associated with the end points 350 (e.g., or the end phones themselves) ultimately control the timing of the call leg ringing in accordance therewith as illustrated and described above in connection with FIG. 4. The present invention thus provides servicing techniques and underlying technology for processing multiple leg calls that may be successfully employed in a service provider network 50 to incorporate dynamically determined ring start delays based on provisioned data and other factors. In this regard, the invention may find utility in implementing enhanced Flexible Alerting services (e.g., for wireless networks), Simultaneous Ringing (landline or IMS networks), and Device Extensions (IMS network), etc.

While the invention has been illustrated and described with respect to one or more exemplary implementations or embodiments, equivalent alterations and modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary implementations of the invention. In addition, although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The following is claimed:

1. A method for processing multiple leg calls to a primary directory number associated with a plurality of member directory numbers, the method comprising:
   receiving an incoming call to a primary directory number associated with a plurality of member directory numbers;
   determining a plurality of delay values corresponding to the plurality of member directory numbers, with each delay value being determined according to a plurality of parameters associated with the corresponding member directory number, wherein the plurality of parameters comprises measured call setup time information associated with each of the member directory numbers;
   measuring call setup times for the member directory numbers before determining the plurality of delay values, comprising:
      a call control function sending at least one query message to an endpoint switch,
      the call control function receiving a response to the query message; and
      the call control function determining an actual call setup delay time based on the time the response is received;
   determining a call leg schedule for processing a plurality of outgoing call legs to the plurality of member directory numbers according to the plurality of delay values; and
   processing and routing the plurality of outgoing call legs according to the call leg schedule.

2. The method of claim 1, wherein the plurality of parameters associated with each of the member directory numbers comprises static information including at least one of end user device technology type, call forwarding disposition, answering machine or voicemail service, and geographic distance to the member directory number.

3. The method of claim 1, wherein the plurality of parameters associated with each of the member directory numbers comprises static information including at least one of end user device technology type, call forwarding disposition, answering machine or voicemail service, and geographic distance to the member directory number.

4. The method of claim 3, further comprising obtaining the static information from a network data store before determining the plurality of delay values.

5. The method of claim 3, wherein the plurality of parameters associated with each of the member directory numbers comprises local information including at least one of signaling type and carrier.

6. The method of claim 5, further comprising obtaining the local information from a routing control function before determining the plurality of delay values.

7. The method of claim 1, further comprising obtaining the plurality of parameters associated with each of the member directory numbers from at least one network element.

8. The method of claim 1, wherein processing and routing the plurality of outgoing call legs according to the call leg schedule comprises:
   a) routing a first outgoing call leg to a first one of the member directory numbers corresponding to the smallest delay value of the call leg schedule;
   b) waiting a period of time determined by a next smallest delay value of the call leg schedule;
   c) after the predetermined period of time, routing a second outgoing call leg to a second one of the member directory numbers corresponding to the next smallest timing delay parameter; and
   repeating steps b) and c) until all outgoing call legs have been routed to the plurality of member directory numbers.

9. The method of claim 1, wherein processing and routing the plurality of outgoing call legs according to the call leg schedule comprises:
   a) determining start times for each call leg according to the delay values of the call leg schedule; and
   b) sending call setup messages for each of the outgoing call legs, the setup messages including the corresponding start time.

10. A system for processing multiple leg calls to a primary directory number associated with a plurality of member directory numbers, the system comprising:
   means for receiving an incoming call to a primary directory number associated with a plurality of member directory numbers;
   means for determining a plurality of delay values corresponding to the plurality of member directory numbers, with each delay value being determined according to a plurality of parameters associated with the corresponding member directory number;
   means for determining a call leg schedule for processing a plurality of outgoing call legs to the plurality of member directory numbers according to the plurality of delay values;
   means for processing and routing the plurality of outgoing call legs according to the call leg schedule; and
   means for measuring call setup times for the member directory numbers, wherein the means for determining the plurality of delay values uses the corresponding measured call setup time and the corresponding plurality of parameters to determine the delay value for each member directory number;
   wherein the means for measuring call setup times comprises a call control element component operative to send at least one query message to an endpoint switch, to receive a response to the query message, and to determine an actual call setup delay time based on the time the response is received.

11. A system for processing multiple leg calls to a primary directory number associated with a plurality of member directory numbers, the system comprising:
   a call control element coupled with a communications network to receive an incoming call to a primary directory number associated with a plurality of member directory numbers; and
   a routing control element coupled with the call control element and with the network to route the outgoing call legs to the corresponding member directory numbers, the routing control element storing local information parameters including at least one of signaling type and carrier for each of the member directory numbers;
   wherein the call control element obtains the local information parameters from the routing control element, determines a plurality of delay values corresponding to the plurality of member directory numbers, with each delay value being determined according to a plurality of parameters associated with the corresponding member directory number, and processes a plurality of outgoing call legs to the plurality of member directory numbers according to the plurality of delay values;
   wherein the call control element measures call setup times for the member directory numbers and determines the plurality of delay values at least in part according to the measured call setup times; and
   wherein the call control element is operative to send at least one query message to an endpoint switch, to receive a response to the query message, and to determine an actual call setup delay time based on the time the response is received.

* * * * *